UNITED STATES PATENT OFFICE 2,511,621

ESTERS OF CYCLOHEXADIENE POLYCARBOXYLIC ACIDS

Paul C. Condit, Berkeley, Calif., assignor to California Research Corporation, San Francisco, Calif., a corporation of Delaware No Drawing. Application February 8, 1946,
Serial No. 646,496

3 Claims. (Cl. 260—75)

This invention relates to new and useful compositions of matter and methods of preparing the same.

More particularly, the invention is concerned with polymeric materials, monomers therefor, and especially with the production of polymeric esters of cyclohexadiene polycarboxylic acids.

It has been discovered that polymeric esters of cyclohexadiene polycarboxylic acids possess valuable and apparently unique properties. These properties render the polymeric esters particularly useful in plastics, coating compositions, adhesives and the like.

It has been found, for example, that esters of cyclohexadiene dicarboxylic acids may be polymerized and that those polymeric esters which are essentially linear in nature have the property of air drying by oxidation and/or polymerization in a manner analogous to that of the natural drying or semidrying oils, even though these synthetic esters contain no drying oil constituent.

Further, it has been discovered that esters may be obtained in accordance with this invention which are capable of conversion to valuable infusible or difficultly fusible solids by thermosetting action without the necessity of eliminating water, an alcohol, etc., as in a condensation polymerization. Important properties of the thermoset solid polymers include freedom from embrittlement and good resistance to abrasion.

The cyclohexadiene dicarboxylic acids from which the compositions of this invention may be derived exist in a number of related isomeric forms. Although these acids have common properties characteristic of the family, they also have outstanding distinguishing properties which set them apart from each other. The system of nomenclature here utilized for identifying these different isomeric acids adopts a standard numbering of the carbon atoms of the cyclohexadiene ring illustrated by the following:

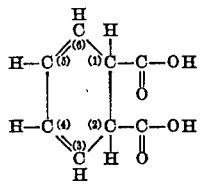

(Full formula)

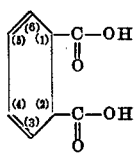

(Formula abbreviated for convenience)

Thus, the position of the carboxyl groups in the above compound is (1), (2).

In the terminology here used, the sign Δ signifies a double bond and Δ1 would indicate a double bond between the (1) and (2) carbon atoms of the ring; Δ2 would place the double bond between the (2) and (3) carbon atom, etc. The complete name of the above acid would, therefore, be Δ3,5-cyclohexadiene dicarboxylic acid-1,2. When the stereo-isomer of this acid is the cis form it is anhydride forming; if the trans type, it does not form its own anhydride but rather the anhydride of the cis acid when treated with suitable reagents such as acetic anhydride.

The foregoing and other acids of this series are sometimes termed dihydrophthalic acids, and identifying numbers utilized merely to place the position of the added hydrogen atoms; for example, the foregoing acid could be designated 1,2-dihydrophthalic acid. But this terminology is misleading insofar as it implies equivalency between the phthalic acids and the cyclohexadiene dicarboxylic acids. Accordingly, this specification utilizes terminology which is believed to describe more accurately the nature of the compounds and compositions discovered.

The compounds and compositions of this invention may be derived from any one or more of the following exemplary cyclohexadiene dicarboxylic acids:

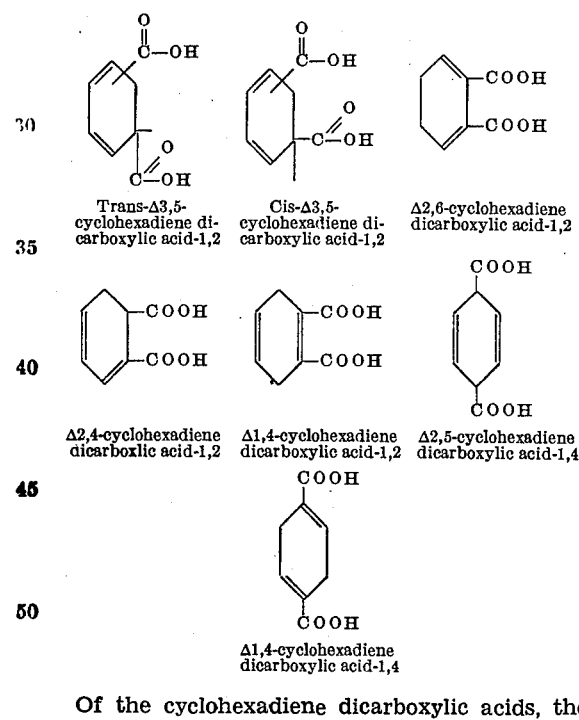

Of the cyclohexadiene dicarboxylic acids, the conjugated diene acids are preferred, and derivatives of the Δ3,5 or Δ2,6-cyclohexadiene dicarboxylic acid-1,2 are at present regarded as most desirable. A mixture predominantly trans-Δ3,5-cyclohexadiene dicarboxylic acid-1,2 but containing small amounts of Δ2,6-cyclohexadiene dicarboxylic acid-1,2 has been found effective for the purpose of this invention.

In accordance with the invention, a monomer may be formed by esterification of a suitable cyclohexadiene polycarboxylic acid with a polyhydric alcohol. A preferred monomer is of the type formula—

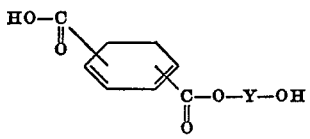

or

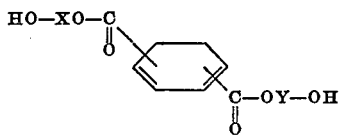

where X and Y are polyhydric alcohol residues which may or may not contain additional hydroxyl groups. Such monomers are frequently difficult to isolate because of their tendency to polymerize. A desirable resin-forming composition of this invention is, therefore, a solution of a cyclohexadiene polycarboxylic acid in a polyhydric alcohol with or without additional solvent. The solution may also contain one or more of the above monomeric esters together with polymers thereof.

Examples of polyhydric alcohols which may be reacted with cyclohexadiene dicarboxylic acids to obtain resinous or polymerizable compositions are glycol, glycerol; polyethylene glycols, such as diethylene glycol, triethylene glycol, tetraethylene glycol; pentaerythritol, sorbitol and mannitol. Alkene oxides, such as ethylene oxide, propylene oxide, and butylene oxides, may be substituted for polyhydric alcohols in the ester-forming reaction. Glycol and glycerol are presently preferred polyhydroxy alcohols which illustrate two different types of polymeric compositions embraced by this invention. Mixtures of the polyhydric alcohols likewise may be utilized to obtain mixed esters; for example, a mixture consisting predominantly of a glycol but also containing some glycerol to yield controlled cross-linking in final polymerization stages is particularly useful. A third type of polymeric ester of cyclohexadiene polycarboxylic acids may be obtained by polymerization of the monohydric alcohol esters, e. g., methyl or ethyl esters.

Polymerization of the foregoing monomeric esters may be controlled to yield an initial polymer which is essentially linear in nature and has a viscous liquid to thermoplastic solid consistency. This initial polymer may be further treated to form an intermediate stage resinous product which is semicross-linked; i. e., cross-linked to a minor but sufficient extent to render the composition difficultly, if at all, soluble in common solvents and yet plastic or moldable. The intermediate stage polymer is, in turn, convertible to a substantially insoluble, infusible polymeric or resinous product.

Each of the three type polymers above described, i. e., the linear polymer, the semicross-linked polymer, and the final three-dimensional infusible polymer, has a field of greatest utility. For example, the linear polymers are useful in coating or impregnating compositions and are capable of air drying by oxidation and/or polymerization in a manner analogous to that of the natural drying oils. The intermediate stage or semicross-linked polymer is especially useful in molding or other compositions when plasticity is desired, and the third stage product is of value in protective coatings or in molded articles and the like, by reason of its relative inertness and resistance to solvents.

The type formula for a typical linear polymer derived from a cyclohexadiene dicarboxylic acid and a polyhydric alcohol is as follows:

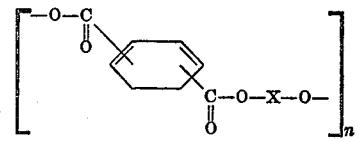

In the above formula, X represents a polyhydric alcohol residue and the structure in brackets is repeated $n$ times to form a long chainlike structure. In the above formula, $n$ may be designated degree of polymerization and may vary from about 2 to about 5 or more in the preferred compositions of the linear type. Lower degrees of polymerization give less viscous liquids, and relatively higher degrees of polymerization yield highly viscous or even hard solid polymeric materials. This type formula represents essentially the type of composition formed in the foregoing first stage of polymerization.

A very valuable property of the above linear type polymer is the fact that it may be converted to a cross-linked, three-dimensional type of polymer without the necessity of splitting out water, alcohol or the like, or without requiring the presence of drying oil constituents. Cross-linking of the linear type polymer may occur by simple addition polymerization to connect two linear chains substantially as indicated below:

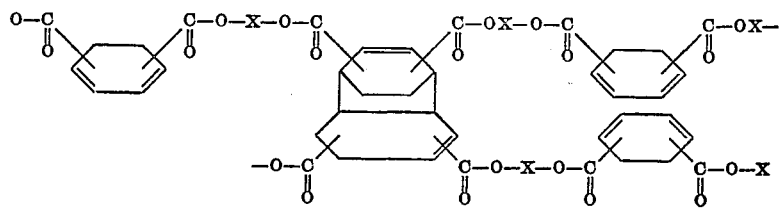

When the linear polymer is a polyester of a dihydric alcohol and a cyclohexadiene dicarboxylic acid, the above type cross-linking may be induced in the polymer substantially to the exclusion of other types, by heating in an inert atmosphere, preferably in the presence of a suitable catalyst. Given opportunity for oxidation, as by exposure to air and incorporation of an oxidation catalyst, the above addition type cross-linking still occurs, but oxygen may be included in the connecting linkage. The exact nature of the cross-linkage on "air drying" or oxidation is not known, but is thought to be similar to that effected in the "drying" of linseed oil and the like.

The esterification of cyclohexadiene dicarboxylic acids with glycerol, or other polyhydroxy alcohols containing more than two hydroxyl groups to form an essentially linear polymer, increases the number of points in the chain at which cross-linking may occur. This is true because of the residual free hydroxyl groups which are present in the linear chain. These linear polymers are usually syrupy liquids to thermoplastic solids and contain the following typical chain elements:

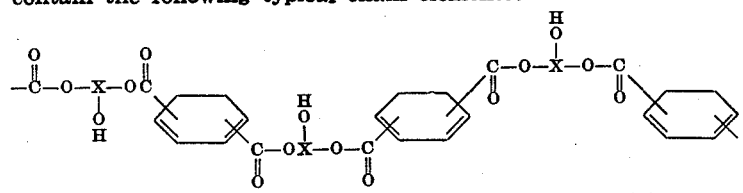

This type of polymer is capable of cross-linkage by addition, by oxidation, and by condensation, as is illustrated by the diagrammatic formula:

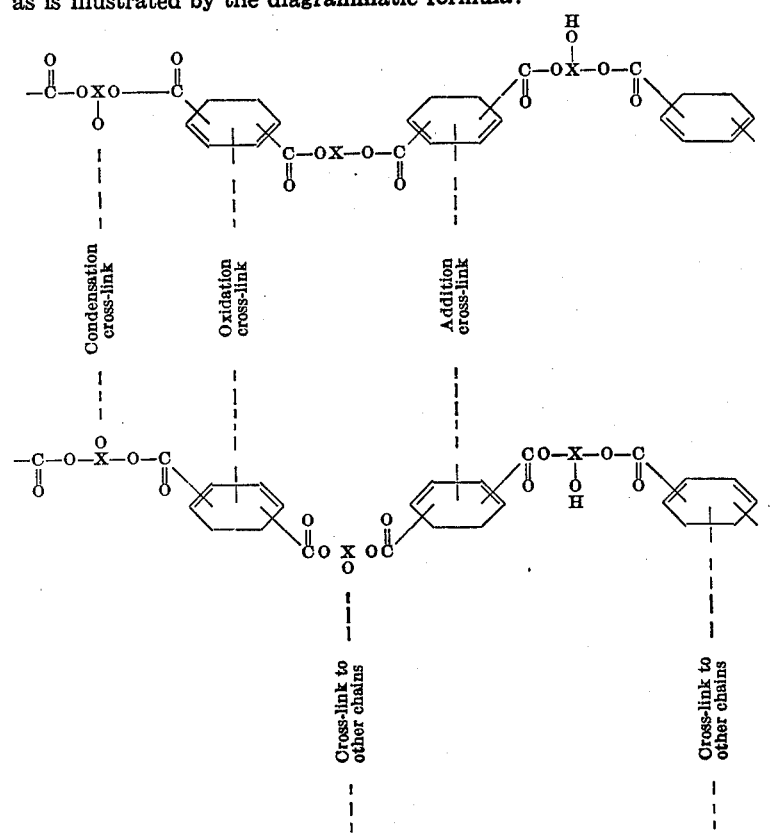

where the dotted lines indicate illustrative potential points of cross-linkage. All of the above types of cross-linkage may, but certainly need not necessarily occur. For example, if an essentially linear polymer of the above described type be mixed with a dicarboxylic acid anhydride of the type formula

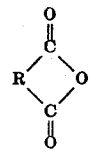

and thermosetting effected in the absence of air or other oxidizing agents, a polymer of the following type may be obtained by a condensation type cross-linkage:

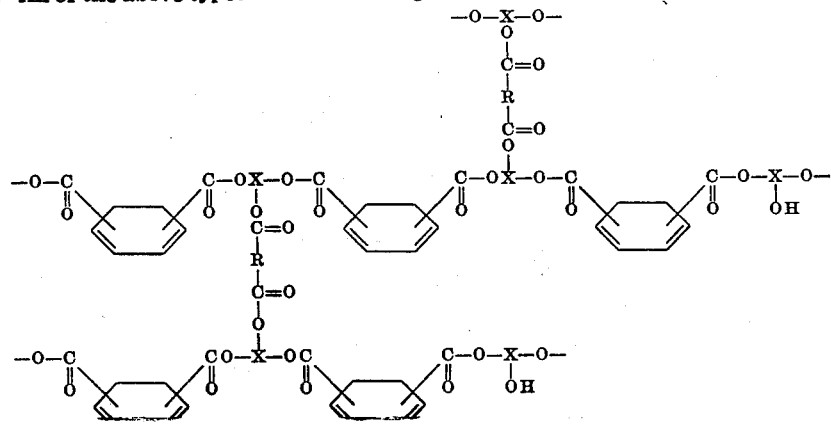

Another type of polymer utilizing the glyceride type polyester of cyclohexadiene dicarboxylic acid is obtained by reaction of the free hydroxyl groups in a linear polymer with such reagents as an unsaturated acid, anhydride, or nitrile, such as acrylic acid, maleic anhydride, or acrylonitrile; or, if desired, with aliphatic monocarboxylic acids such as long chain oil solubilizing fatty acids. Examples of such long chain acids are lauric, myristic, stearic, arachidic, oleic, and the like acids. Polymeric esters of the multiple or mixed type will be described in more detail hereinafter.

The following specific examples will serve to illustrate the derivation and preparation of the esters of this invention and to guide those skilled in the art in obtaining the same.

*Example 1.*—A linear polymeric ester comprising the reaction product of $\Delta 3,5$-cyclohexadiene trans-dicarboxylic acid-1,2 (which may contain a small amount of a $\Delta 2,6$ isomer when desired) and ethylene glycol was prepared by mixing 10 g. of this acid with 4 cc. (7/6 of theory) of ethylene glycol and heating in an oil bath maintained at about 175° C. The reaction mixture was protected from oxidation by bubbling carbon dioxide therethrough and heating was continued for 1½ hours. The original suspension turned to a clear solution as it reached bath temperature and gradually became more and more viscous as heating proceeded. The product after 1½ hours was a clear, light yellow, very viscous oil and was tacky to the touch. A chloroform solution of the product decolorized a carbon tetrachloride solution of bromine instantaneously and exothermally. This viscous oil is a polymeric ester which is actively unsaturated and capable of addition polymerization to form either a semicross-linked difficultly soluble polymeric ester on exposure to air or a substantially insoluble three-dimensional cross-linked polymer on heating. These last features, together with utility in coating compositions, are illustrated in Examples 2, 3 and 4.

*Example 2.*—A coating composition was prepared by dissolving 2.5 g. of the polymerized viscous reaction product of Example 1 in 5 cc. of chloroform as a solvent. This solution was painted in a thin film on a clean glass plate, exposed to sunlight, and allowed to dry. After 6 weeks the resin film was a semicross-linked polymeric ester as shown by the fact that it was normally solid and partially insoluble in chloroform, whereas the original linear polymer of Example 1 was a viscous liquid completely soluble in chloroform. The cross-linking was effected by addition polymerization in the presence of oxygen and at normal room temperature. Condensation polymerization is precluded under these conditions since the reaction condition are not such as would produce esterification and the elimination of water or ethylene glycol.

The polymeric esters of this invention are responsive to the action of metal salt oxidation catalyst, commonly designated "driers" in the paint and varnish industry. This valuable property is illustrated in the following example.

*Example 3.*—2.5 g. of the polymerized viscous reaction product of Example 1 was dissolved in 5 cc. of chloroform, and 0.33 cc. of a commercial metal naphthenate drier containing 17% lead and 1.7% cobalt was added to this solution. The coating composition so prepared was painted in a thin film on a clean glass plate, and exposed to sunlight, and allowed to dry under the same conditions as in Example 2, above. This film polymerized by addition and/or oxidation much more rapidly than that of Example 2. It had lost most of its tackiness after 24 hours and was nearly completely dry to the touch after 48 hours. The polymer thus obtained was a semicross-linked resin, normally solid, and partially insoluble in chloroform.

The linear polymer of Example 1 is thermosetting and capable of conversion to a three-dimensional, insoluble, relatively hard resin.

*Example 4.*—A coating composition was prepared as in Example 2, and the solution painted on a clean glass plate. The resin film thus obtained was heated at a temperature of from about 135° to about 150° C. in an electrically heated oven. At the end of 4 hours of heating the plate was removed from the oven and cooled. Examination revealed that the resin was a hard, thermosetting, cross-linked polymer completely insoluble in chloroform and substantially untouched by the action of this solvent at room temperature. The coated plate was inspected over an extended period and no spalling, cracking or further discoloration of the film occurred. When scratched with a knife, the film proved to be as hard as it was originally after baking, and a fragment chipped off was flexible and showed no apparent embrittlement.

By way of comparison, it is noted that the foregoing linear polymers of Example 1 dry at room temperature in air somewhat faster than raw linseed oil. The resin film left by the dried coating composition is comparable to, but not as hard as, the one formed under the same conditions by linseed oil. The baked resin films are quite hard but nonbrittle, as above noted.

*Example 5.*—A polymer was produced using $\Delta 3,5$-cyclohexadiene trans-dicarboxylic acid-1,2 with glycol and the resinification carried to the gelation stage in this example. The batch formula was:

10 g. $\Delta 3,5$-cyclohexadiene trans-dicarboxylic acid-1,2

4 cc. ethylene glycol

The ingredients were mixed and heated in an oil bath at about 160° to 175° C. Carbon dioxide was bubbled through the reaction mixture and, to follow the course of the reaction, samples were removed periodically, dissolved in alcohol, and titrated with alcoholic KOH.

| Time, hours | Neutralization No. (mg. KOH/g.) |
| --- | --- |
| 1 | 167 |
| 2 | 110 |
| 4.5 | 48 |

Difficulty was experienced in obtaining the last neutralization number since the reaction mixture had reached the gelation stage and the product was solid at room temperature. The final polymerized reaction mixture was only partially soluble in alcohol.

*Example 6.*—A solution of the monomeric diester of ethylene glycol was prepared by careful and controlled reaction of an excess of the glycol with $\Delta 3,5$-cyclohexadiene trans-dicarboxylic acid-1,2. The batch formula was:

10 g. $\Delta 3,5$-cyclohexadiene trans-dicarboxylic acid-1,2

100 cc. ethylene glycol

The batch was refluxed at the boiling point of the reaction mixture under substantially atmospheric pressure using a steam jacketed reflux condenser to prevent loss and condense the boiling ethylene glycol. Water formed by the esterification reaction was taken overhead. An inert atmosphere was maintained in the reaction zone by passing carbon dioxide through the system. 1 cc. samples were pipetted out of the reaction mixture and titrated with alcoholic KOH to follow the course of the esterification reaction.

| Time, hours | Neutralization No. (mg. KOH/ cc. solution) |
|---|---|
| 1.5 | 8.1 |
| 4.5 | 2.99 |
| 7.5 | |

5 cc. of liquid were obtained overhead in the 7.5 hours. 60 cc. of the ethylene glycol were then removed by vacuum distillation under 2 mm. of mercury pressure. The resulting concentrated solution was a viscous liquid ester completely soluble in water. 1 cc. required 10.4 mg. of KOH. The complete solubility in water of the monomeric ethylene glycol diester distinguishes it from the polymeric ester. The solution contained a small amount of the monomeric monoester of ethylene glycol as indicated by the fact that 1 cc. required 10.4 mg. of KOH for neutralization. By way of comparison, it should be noted that the original solution (without any esterification) would require approximately 67 mg. of KOH to neutralize 1 cc., and the concentrated solution (after removal of the ethylene glycol by vacuum distillation) would require 167 mg. of KOH per cc. The acid ester, that is, the monomeric monoester of ethylene glycol, would require 33.5 mg. of KOH per cc. of the original solution and 83.5 mg. of KOH per cc. of the concentrated solution formed by vacuum distillation. The fact that the ester was completely soluble in water shows that the amount of polymeric ester present was negligible since these polymers have been found to be water-insoluble.

Either the monomeric ester or the solution thereof is capable of further polymerization on heating to form polymeric esters of the type herein described.

Example 7.—A soluble, plastic, solid polyester of Δ2,6-cyclohexadiene dicarboxylic acid-1,2 from Δ3,5-cyclohexadiene dicarboxylic acid-1,2 was prepared as follows: Δ3,5-cyclohexadiene trans-dicarboxylic acid-1,2 was mixed with a 5.1% molar excess of ethylene glycol. The mixture was immersed in a bath at 120° C. and heated at 120° to 147° C. for 1 hour and 58 minutes. After standing over night at room temperature, the partially reacted mixture was immersed in a bath at 32° C. and the temperature raised to a maximum of 151° C. during a period of 2 hours and 6 minutes. The temperature was then raised from 151° to 174° C. over a period of 45 minutes and the temperature maintained at 171° to 177° C. for 37 minutes. At this stage the reaction mixture was removed from the bath for about 1 hour and heating resumed at 170° to 176° C. for 48 minutes. During an additional and final 45 minutes of heating the temperature was maintained in the range of 166° to 176° C. and the pressure at 3 mm. to effect further polymerization and to remove unused glycol together with any water present. During this period a small amount of white solid distilled from the reaction mixture. The system was separated from the atmosphere with a carbon dioxide trap during the reaction period and a stream of $CO_2$ gas was drawn through the reaction mixture as it was heated under vacuum. The product remaining in the reaction flask was a thick, yellow syrup that solidified on cooling to a clear, yellow, glassy solid. A 95.5% yield of this resin was obtained calculated on the basis of complete reaction of one mol of acid per mol of glycol. The polymer was found to be soluble in acetone and 5% aqueous sodium bicarbonate, almost completely soluble in chloroform, partly soluble in hot ethyl alcohol, and insoluble in water, benzene, carbon tetrachloride, petroleum ether and diethyl ether. The product flowed at 66.6° to 70.6° C. in a copper block melting point apparatus.

It is to be noted that in the preparation of this polymer, the total period of heating was about 6¼ hours of which 2¼ hours was at about 170° C. Determination of the ultraviolet light absorption characteristics of this polymer revealed that the Δ3,5-cyclohexadiene dicarboxylic acid-1,2 had isomerized by reason of the prolonged high temperatures to which it had been subjected during preparation, and that the polymeric ester was essentially an ester of the Δ2,6-cyclohexadiene dicarboxylic acid-1,2.

The following analyses were obtained on this reaction product:

| Test | Found |
|---|---|
| Per cent carbon | 58.55 |
| Per cent hydrogen | 5.12 |
| Molecular weight | [1] 900–1100 |
| Saponification equivalent | 100 |
| Neutralization equivalent | 488 |

[1] Ebullioscopic method.

This corresponds to a polyester with an average composition of about five cyclohexadiene dicarboxylic acid groups joined through four ethylene glycol groups.

Example 8.—The preparation of a polymeric cyclohexadiene dicarboxylic acid ester of a polyhydroxy alcohol containing more than 2 hydroxyl groups is illustrated by the reaction of Δ3,5-cyclohexadiene trans-dicarboxylic acid-1,2 with glycerol to obtain an insoluble solid three-dimensional polymer:

Δ3,5-cyclohexadiene trans-dicarboxylic acid-1,2 and glycerol were mixed in chemically equivalent quantities (3 mols of acid to 2 mols of glycerol) and heated at 186.5° to 194° C. for 1 hour and 43 minutes while carbon dioxide was passed through the reaction mixture. The temperature of heating was then raised to 193° to 195° C. and maintained for 45 minutes under a pressure of 10 mm. of mercury. A small amount of white solid distilled along with the water formed during the reaction. Gelation of the reaction mixture had occurred at the end of 65 minutes of reaction and the final product was a clear yellow, hard, glassy solid, insoluble in water, 5% aqueous sodium bicarbonate solution, acetone, mesityl oxide, ethyl alcohol, butyl acetate, ethyl ether, carbon tetrachloride, chloroform, ethylene chloride, toluene, petroleum ether, and petroleum thinner. The product swelled slightly in dioxane and "Cellosolve." On the basis of complete reaction the yield was 94.6% of the theoretical. Analysis showed this material to contain 59.02% carbon and 5.19% hydrogen. The saponification equivalent for this solid was found to be 102.

By utilizing 1 mol of acid to 1 mol of glycerol and interrupting polymerization before gelation occurs, a soluble or linear type polymer is obtained.

Example 9.—Δ3,5-cyclohexadiene trans-dicarboxylic acid-1,2 was mixed with a 10% molar excess of ethylene glycol and the mixture placed in a bath heated to 150.5° C. The temperature of the batch was rapidly raised and the heating was continued for 1½ hours at about 165° C. to a little above this temperature. The system was then evacuated to 4 to 6 mm. of mercury pressure and the temperature of the batch maintained at 170° to 175° C. for 20 minutes. During the entire preparation a stream of carbon dioxide was passed through the reaction mixture. The water formed by the reaction distilled during the preparation and a small amount of crystalline solid was also collected in the distillate during the heating under vacuum. The product was a light golden colored viscous liquid that changed to a glassy solid upon cooling. A 94.6% yield was obtained when calculated for a reaction product of equivalent quantities of acid and glycol. This solid was soluble in aqueous 5% sodium bicarbonate solution, chloroform, acetone and ethyl acetate. It dissolved in hot ethyl and methyl alcohol but deposited from the cooled solution. It was partly soluble in benzene, very slightly soluble in boiling water, insoluble in cold water, and insoluble in petroleum ether and diethyl ether. A sample of the ester was dissolved in chloroform and the color removed with decolorizing carbon. The polymeric ester was then precipitated from the filtered chloroform solution by the addition of petroleum ether and re-precipitated from chloroform with petroleum ether four times. This purified product was dried in a vacuum desiccator for 4 days and powdered to yield a white solid. When heated on a copper block melting point apparatus the polymer started to melt at 45° C. The detail data on the properties are as follows:

| | |
|---|---|
| Per cent carbon | 56.67 |
| Per cent hydrogen | 5.66 |
| Molecular weight (boiling point method) | 810 |
| Saponification equivalent | 95.4 |
| Neutralization equivalent | 400 |
| Specific extinction (at 254 m$\mu$) | 21.3 |

The extinction (Brode, Chemical Spectoscopy, 1939) above indicated represents a maximum in the ultraviolet light absorption curve at 254 m$\mu$ and is a characteristic exhibited by the parent acid, Δ3,5-cyclohexadiene transdicarboxylic acid-1,2. This shows that the product was essentially a polymeric ester of this acid. In the preparation of this ester care was taken to avoid prolonged heating at elevated temperatures, particularly at temperatures above 170° C. The total period of heating was about 2 hours.

*Example 10.*—Δ2,6-cyclohexadiene dicarboxylic acid-1,2 was mixed with a 10% molar excess of ethylene glycol and the mixture heated at 162.5° to 186° C. for 3 hours and 36 minutes when the distillation of water formed by esterification appeared complete. The mixture was then heated at 165° to 175° C. under a vacuum of 5 to 6 mm. of mercury pressure for 1 hour. Carbon dioxide was passed through the reaction mixture throughout the heating and a small amount of white solid was collected in the distillate. The product was a viscous yellow liquid which solidified to a yellow, glassy solid upon cooling. The yield was 90.3% of theoretical for a reaction product of equivalent quantities of acid and glycol. The solid polymer possessed solubility characteristics like those of the polymer in Example 9 and it was purified by the same procedure to yield a white solid which began melting at 67° C. when heated on a copper block. Analyses of this polymer were as follows:

| | |
|---|---|
| Per cent carbon | 55.36 |
| Per cent hydrogen | 5.27 |
| Molecular weight (boiling point method) | 900 |
| Saponification equivalent | 94.5 |
| Neutralization equivalent | 409 |

*Example 11.*—A polymeric reaction product of Δ2,4-cyclohexadiene dicarboxylic acid-1,2 and a polyhydric alcohol is prepared by reacting this acid with ethylene glycol, utilizing the method and precautions described in Example 9, above, concerning the corresponding reaction with the Δ3,5-cyclohexadiene dicarboxylic acid-1,2. Viscous liquid to solid polymeric esters are obtained. A polymeric ester likewise is derived from Δ1,4-cyclohexadiene dicarboxylic acid-1,2 by reaction with ethylene glycol at elevated temperatures as in the foregoing examples. Viscous liquid to solid polymers result depending upon the time and temperature of heating, as is illustrated in previous preparations.

*Example 12.*—Δ2,5-cyclohexadiene dicarboxylic acid-1,4 is reacted with ethylene glycol by heating until esterification and polymerization occur. Polymeric esters also may be prepared in like manner by reacting Δ1,4-cyclohexadiene dicarboxylic acid-1,4 with ethylene glycol or other polyhydroxy alcohols.

As previously indicated, multiple or mixed type polymeric esters may be formed in accordance with the principles of this invention by interpolymerization with other copolymerizable organic materials to yield a copolymer or mixed polymer. For example, a copolymerized, mixed polyester is obtained by intercondensation of a mixture of phthalic anhydride, a cyclohexadiene dicarboxylic acid, and ethylene glycol to yield the characteristic structure—

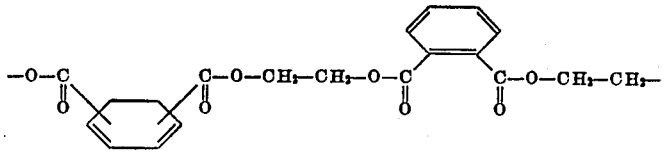

Or, maleic anhydride may be substituted for the phthalic anhydride in the foregoing reaction mixture to yield a polyester composition. The unsaturation of these copolymers is less active in that they have a reduced rate of air drying. The extent of reduction in unsaturation activity depends on the reduction in content of the cyclohexadiene dicarboxylic acid nuclei in the polymeric ester, or, conversely, on the increase in content of less actively unsaturated acid residues.

Other polycarboxylic acids, or anhydrides thereof, may be substituted for the maleic or phthalic anhydride to produce copolymers or mixed polymers. Examples of other polycarboxylic acids are: oxalic, succinic, glutaric, adipic, pimelic, azelic, malic, malomaleic, fumaric, tartaric, citric, alkyl malonic acids, citra-conic, mesa-conic, and ita-conic acids. Likewise, mixed polymeric esters or copolymers may be produced with cyclohexadiene dicarboxylic acids and maleic anhydride "adducts" with other dienes; for example, mixed polymeric esters of Δ3,5-cyclohexadiene dicarboxylic acid and an "adduct" such as—

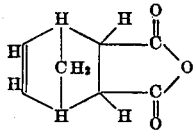

or

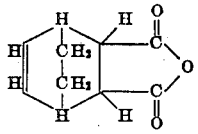

In order to adapt the foregoing types of mixed polyesters or interpolymers to certain uses, as where greater oil solubility or plasticity is desired, a part or all of the glycol may be replaced with glycerol or the like and a long chain aliphatic monocarboxylic acid component introduced in the polymer by esterification of residual hydroxyl groups of the glycerol component. For example, polymers containing the following chemical grouping may be obtained:

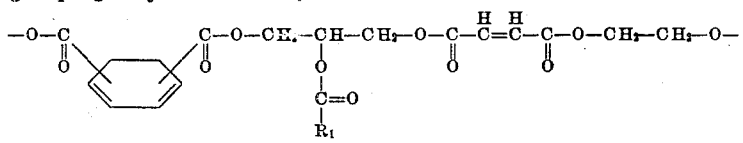

where R₁ is a residue of long chain fatty acids such as lauric, stearic, oleic, or the like.

*Example 13.*—The preparation of a mixed ester or copolymer of the foregoing type is illustrated by the following procedure in which the batch formula was:

10 g. Δ3,5 - cyclohexadiene trans - dicarboxylic acid-1, 2
5.8 g. maleic anhydride
7.8 cc. ethylene glycol The ingredients were mixed and heated in an oil bath maintained at 150° C. A slow stream of carbon dioxide was bubbled in the mixture throughout the reaction period. A homogeneous solution was obtained and the condensation reaction was interrupted after 1½ hours. The final product was lighter in color than the straight or unmixed cyclohexadiene dicarboxylic acid polyester and it possessed a lower viscosity. The product also was less soluble in chloroform but was quite soluble in ethyl acetate.

A coating composition was prepared by dissolving 0.5 g. of the above mixed polymer in 1 cc. of ethyl acetate and the solution painted on a clean glass plate. This film was exposed to sunlight at room temperature under the conditions utilized in Examples 2 and 3 and the plate inspected at intervals. After 9 weeks the film had "dried" appreciably by further polymerization, but the drying rate was lower than that of the films in Examples 2 and 3. 50 mg. of benzoyl peroxide did not appear to accelerate the drying rate of an otherwise duplicate preparation of the mixed polymer in ethyl acetate.

Polymeric linear type esters of increased molecular weight are produced by effecting condensation polymerization under extremely high vacuum, as, for example, under from about $10^{-2}$ to $10^{-6}$ mm. of mercury pressure in an apparatus such as described in the Journal of the American Chemical Society, 54, 1557 (1932). Such polymers are herein termed "linear super-polymers," since molecular weights are reached by this process which are not obtainable under ordinary condensation polymerization conditions.

In order to prevent cross-linking by addition polymerization during manufacture of the linear condensation polymer when it might otherwise occur, a polymerization inhibitor may be utilized. Typical inhibitors of addition polymerization are compounds of phenolic type, especially polyhydric phenols, such as hydroquinone and tertiary butyl catechol.

Throughout this specification and the claims, the term "polymerization" has been used in its generic sense to include either addition polymerization or condensation polymerization. "Addition polymerization" designates polymer formation by an addition type reaction, as where a carbon to carbon double bond opens and adds to another double bond; for example—

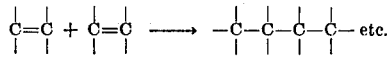

In this type of reaction, elimination of a compound such as water is not necessary to effect polymer formation. On the contrary, the term "condensation polymerization" is here used to include those reactions in which polymer formation is effected by repeated elimination of a reaction product, usually water or an alcohol, for example—

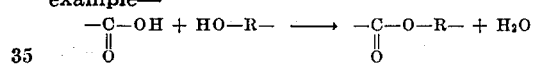

In accordance with these definitions, addition polymerization includes those reactions in which oxygen may intervene in or activate polymer formation.

Although the specific illustrations here given utilize the free acid in the esterification reaction, it is to be understood that other ester-forming derivatives of the cyclohexadiene dicarboxylic acids may be substituted therefor in processes for preparing either the monomeric or polymeric esters. Where the acid is of the anhydride-forming type, it is frequently advantageous to substitute the anhydride for the free acid. Also, it is possible to use other ester-forming derivatives such as the acid chloride, the amide, or the imide, with liberation of the more volatile HCl or NH₃ from an anhydrous reaction medium during esterification. Suitable precautions should be taken to prevent addition of the HCl or NH₃ to the ester. Ester interchange may be utilized to prepare the polyhydric alcohol esters, as by reacting ethylene glycol or glycerol with the simple methyl ester of the cyclohexadiene acids and distilling off methyl alcohol as it is freed by the reaction. Other suitable variations of the methods herein disclosed will be apparent to those skilled in the art.

The melting points of typical cyclohexadiene dicarboxylic acids and their corresponding anhydrides are as follows:

| | Melting point of— | |
|---|---|---|
| | Acid | Anhydride |
| Δ3,5-cyclohexadiene trans-dicarboxylic acid-1,2 | 210 | |
| Δ3,5-cyclohexadiene cis-dicarboxylic acid-1,2 | 173–175 | 99–100 |
| Δ1,4-cyclohexadiene dicarboxylic acid-1,2 | 153 | 134–135 |
| Δ2,4-cyclohexadiene dicarboxylic acid-1,2 | 179–180 | 103 |
| Δ2,6-cyclohexadiene dicarboxylic acid-1,2 | 215 | 81–82 |

The melting points of some of the above acids are not precise due to complications, such as tendency to isomerize, decompose or to lose water and form anhydrides.

Suitable procedures for preparing the various cyclohexadiene dicarboxylic acids are disclosed in the literature. The Δ3,5-cyclohexadiene trans-dicarboxylic acid-1,2 may be prepared, for example, by sodium mercury amalgam or electrolytic reduction. The Δ3,5-cyclohexadiene trans-dicarboxylic acid-1,2 utilized in the specific examples herein disclosed was prepared by electrolytic reduction of phthalic acid in sulfuric acid solution. Such a method is disclosed in Berichte, volume 39 (III) 1906, pages 2933 to 2942. The Δ2,6 acid may be prepared by heating a concentrated solution of the Δ3,5 acid in water for 9 hours.

By reason of their valuable properties, the monomers and polymers of this invention are capable of use in many fields; for example, the polymeric esters may be utilized in coating compositions, molding compositions, in adhesives for the manufacture of laminated glass or plywood and the like. The soluble type polymers may be used in printing inks, coatings on rubber, paper, or fabrics, as in the production of artificial leather, as a primer coating for metal surfaces where a bonding agent is desired. Use as a component of an oxidizing vehicle in varnishes and paints is a particularly valuable application of the air drying type polymers. In molding compositions, the valuable thermosetting property is a preferred and predominant feature. Because of flexibility and good abrasion resistance obtainable with the polymeric esters herein described, these materials are also adapted for use in or on floor coverings (linoleum, etc.), or in electrical insulation, as well as a binder where resistance to shock loads is important.

The monomeric esters or low polymers may be further polymerized alone or copolymerized with other monomers or polymers to yield modified resinous products with improved characteristics. For example, the so-called alkyds may be modified with the cyclohexadiene dicarboxylic acid esters to impart valuable thermosetting or air drying properties. Further, the polymeric esters of this invention may be converted to metal salts. Treatment with an alkali metal hydroxide converts ester or terminal acid groups of the polymer to the alkali metal salts. These alkali metal salts may, in turn, be converted to polyvalent metal salts by metathesis, e. g., by reacting aqueous calcium chloride with an aqueous dispersion of the sodium salt to form sodium chloride and the calcium salt.

Although this invention has been illustrated with various presently preferred processes and products, numerous alterations utilizing the principles thereof will occur to those skilled in the art, and it is to be understood that the invention is not limited to the specific examples and may be otherwise embodied or practiced within the scope of the appended claims.

I claim:

1. A polymeric ester of Δ3,5-cyclohexadiene dicarboxylic acid-1,2 and glycol.

2. A polymeric ester consisting essentially of the reaction product of Δ3,5 cyclohexadiene dicarboxylic acid and a polyhydric alcohol having only hydroxyl groups as reactive substituents.

3. A polymeric ester consisting essentially of the reaction product of Δ3,5 cyclohexadiene dicarboxylic acid and a glycol having only hydroxyl groups as reactive substituents.

PAUL C. CONDIT.

REFERENCES CITED

The following references are of record in the file of this patent:

UNITED STATES PATENTS

| Number | Name | Date |
|---|---|---|
| 1,860,730 | Brooks et al. | May 31, 1932 |
| 1,998,744 | Ubben | Apr. 23, 1935 |
| 2,323,706 | D'Alelio | July 6, 1943 |
| 2,391,226 | Clifford et al. | Dec. 18, 1945 |
| 2,403,791 | D'Alelio | July 9, 1946 |
| 2,421,876 | Gerhart | June 10, 1947 |
| 2,445,553 | Beavers | July 20, 1948 |

OTHER REFERENCES

Kienle et al., Ind. and Eng. Chem., April 1929, p. 349.